Feb. 19, 1957 J. A. MORAN 2,782,047
FOLDING MATERIAL HANDLING CART
Filed Aug. 10, 1953 2 Sheets-Sheet 1
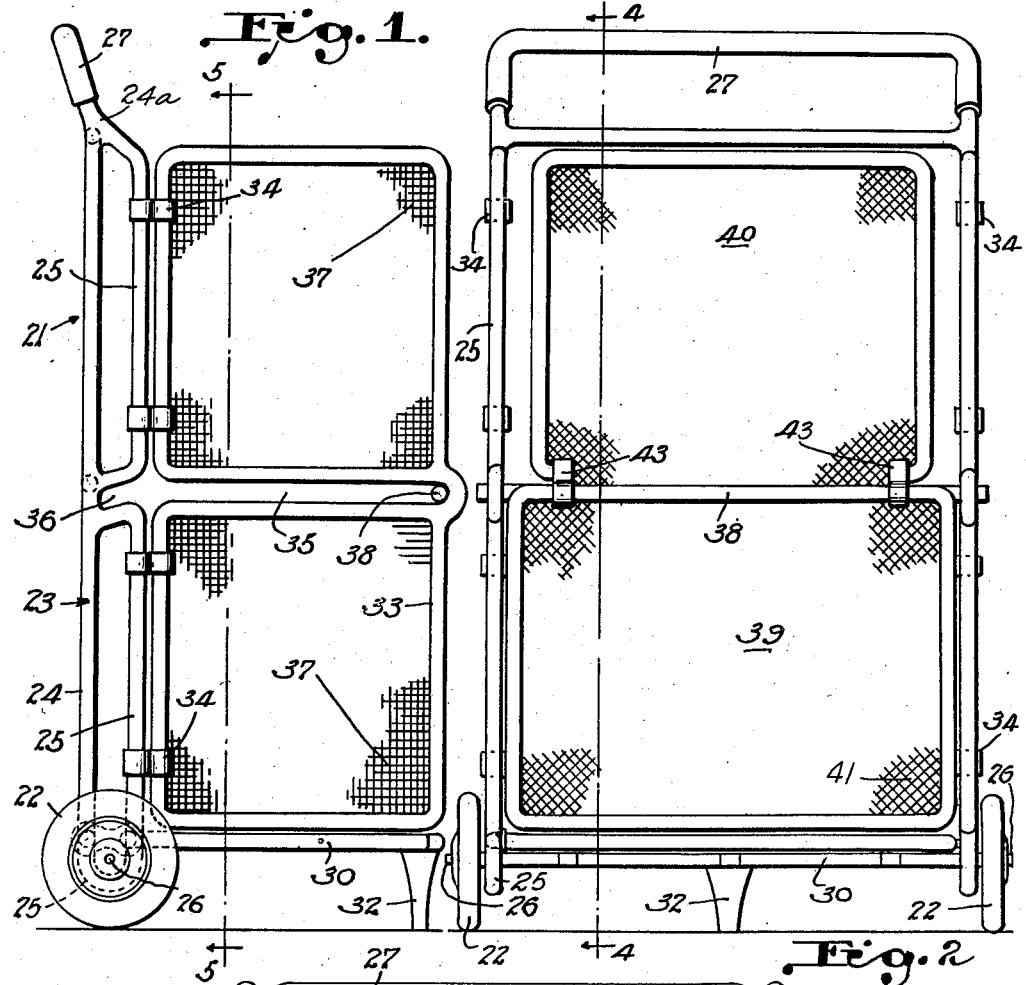
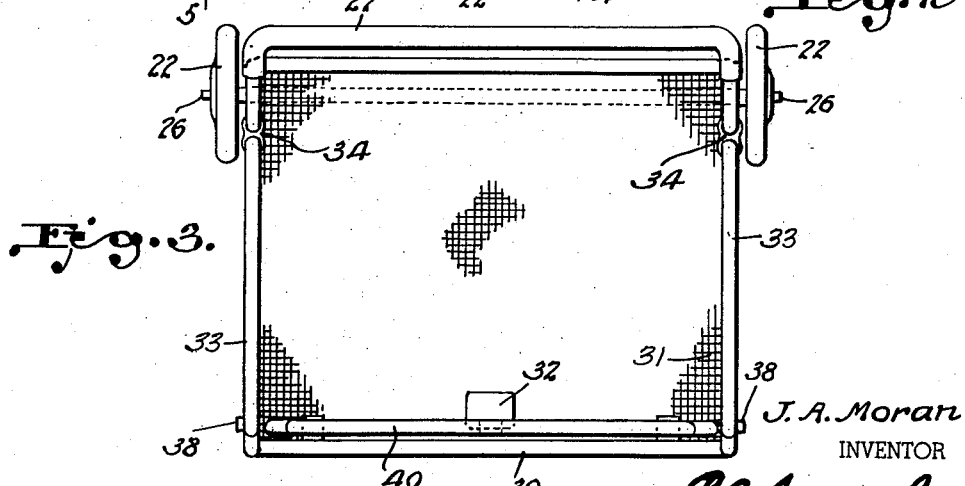
J. A. Moran
INVENTOR Feb. 19, 1957  J. A. MORAN  2,782,047
FOLDING MATERIAL HANDLING CART
Filed Aug. 10, 1953  2 Sheets-Sheet 2
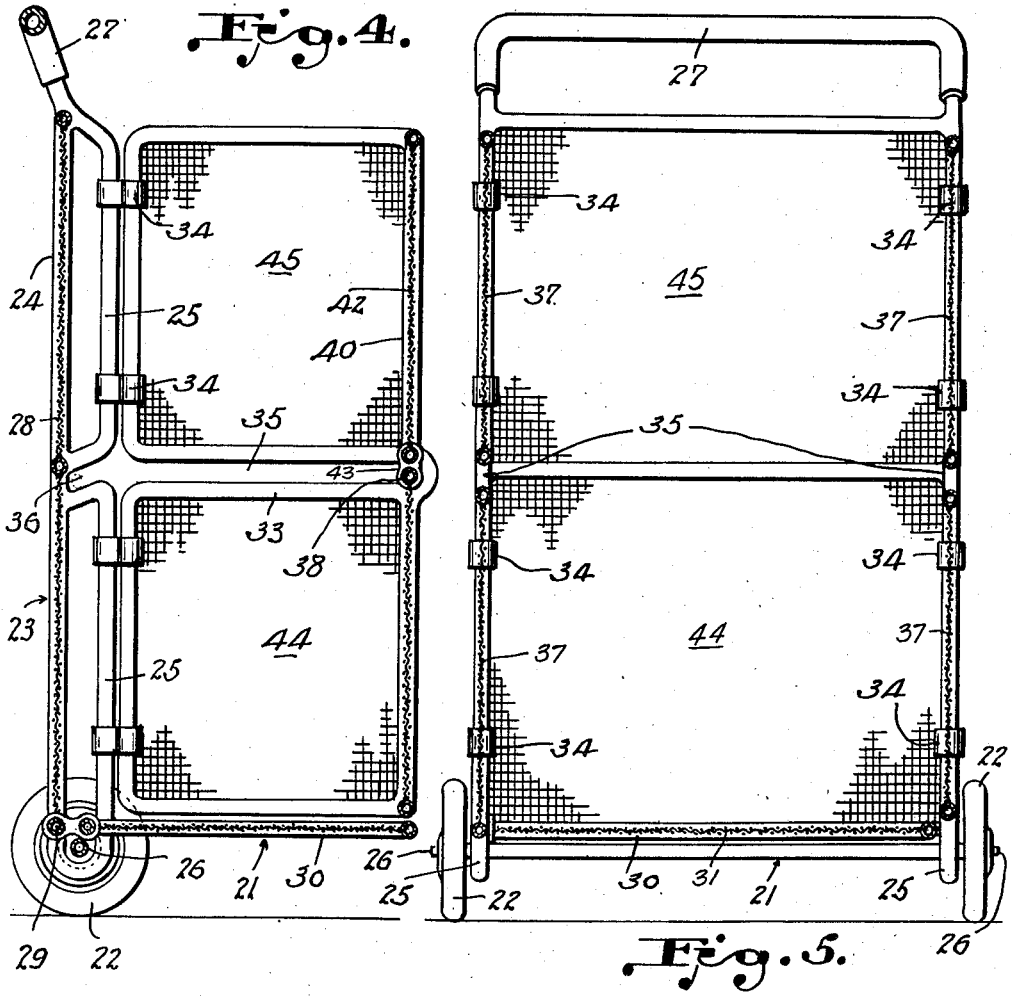
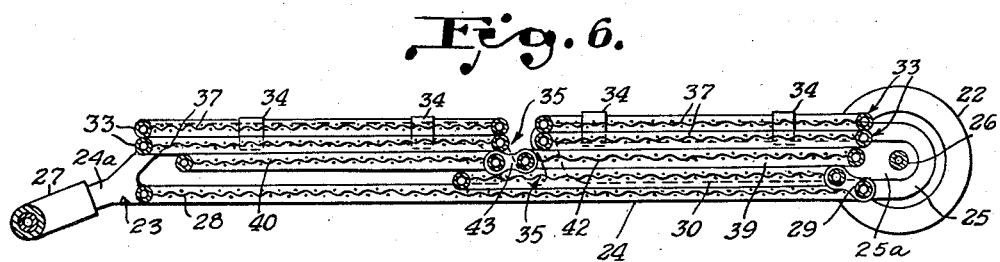
J. A. Moran
INVENTOR
BY C. A. Snow & Co.
ATTORNEYS.

United States Patent Office 2,782,047
Patented Feb. 19, 1957

2,782,047

FOLDING MATERIAL HANDLING CART

Joseph A. Moran, High Point, N. C.

Application August 10, 1953, Serial No. 373,416

4 Claims. (Cl. 280—36)

It is an object of this invention to provide a folding material handling cart of the kind to be more particularly described hereinafter which is light in weight and strong in construction to carry heavy and elongated articles, when in an extended or unfolded position, and yet easy to handle, when empty, for support on the side of a wall or vehicle.

It is another object of this invention to provide a foldable article handling cart of this kind having horizontally foldable side walls and vertically foldable top, bottom and intermediate walls, foldable from an outwardly extending position of an unfolded cart to an inward, overlying position of a folded or collapsed cart.

It is a further object of this invention to provide a foldable cart of this kind which is particularly adapted to carry articles of various sizes or length in the unfolded position of the walls of the cart, the intermediate walls being foldable to accommodate the articles carried in the cart.

Still another object of this invention is to provide a foldable material handling cart particularly adapted for carrying packaged ice cream and having separate compartments for holding the different assortments of ice cream while transporting the ice cream between a truck and dispenser, as a store, or for transporting the packaged ice cream from the truck for the individual and separate sale of the packages.

It is still another object of this invention to provide a lightweight folding cart of this kind which is capable of being easily folded for ready transportation in or on a truck and which may be readily constructed at an economical cost for the user.

Other and further objects and advantages of the invention will be hereinafter described and the novel features thereof defined in the appended claims.

In the drawings:

Fig. 1 is a side elevation of a material handling cart constructed according to this invention.

Fig. 2 is a front elevation.

Fig. 3 is a plan view.

Fig. 4 is a cross sectional view taken on the line 4—4 of Fig. 2.

Fig. 5 is a transverse cross sectional view taken on the line 5—5 of Fig. 1.

Fig. 6 is a diagrammatic showing in side elevation of the material handling cart in the folded position.

Referring to the drawings, the numeral 21 designates generally a material handling cart, constructed according to this invention, for transporting material, as packages, from a truck to a store or for distribution of the individual and separate packages to the general public after the packages have been removed from a truck or source of supply or storage. The material handling cart 21 is formed for storage or storing in a restricted space in a building or for hanging on a wall of a building or on to a side of a material truck where the material handling cart 21 is adapted to be used. The material handling cart 21 is adapted to be opened from a fully folded position, as clearly shown in Fig. 6 of the drawings to an extended position as shown in Figs. 1 to 5 of the drawings. In the folded or contracted position of the material handling cart, the cart may be easily stored in a restricted space or hung from a wall or side of a truck and in the extended condition of the cart 21 may be used for transporting material, as material in packaged form, from one place to another or for transporting the packaged material for distribution.

The material handling cart 21 is formed with a plurality of foldable frames having wheels 22 supported at one end, as on the bottom, of a rear supporting frame 23. The basic or rear supporting frame 23 is adapted to be formed of elongated tubular material bent upon itself to form the tubular outer rear frame bar 24 and guide members or bars 25 on the inside of the supporting frame 23 spaced from the frame bars 24 as clearly shown in Fig. 1 of the drawings.

An axle 26 is carried by the tubular material of the rear frame 23 at the point 25$^a$ where the tubular material is bent upon itself at the lower end of the rear supporting frame 23. The wheels 22 are rotatably mounted on the outer ends of the axle 26 for moving the material handling cart 21 about where and as desired.

A tubular handle 27 telescopes over an extension 24$^a$ which projects from the upper end of bar 24 and extends between the opposite sides of the material handling cart 21.

A wire mesh 28 is secured within the rear supporting frame 23 by any suitable fastening means so that the wire mesh will provide a rear wall of the material handling cart 21.

A link 29 pivotally secured to the supporting frame 23 at the lower end thereof and above the axle 26. A bottom frame 30 is pivotally mounted on the material handling cart 21 by pivotally connecting the bottom frame 30 to the link 29 so that the bottom frame is hingedly connected to the supporting frame 23 for movement from a horizontally extending position as shown in Fig. 1 in the drawings to a position overlying the supporting frame 23 as shown in Fig. 6 of the drawings. The longitudinally extending bars of the frames 23 and 30 are formed of tubular material, the material being light in weight and strong in construction for the use of the material handling cart 21. A wire mesh screen 31 is secured to the bottom frame 30 to form the bottom of the material handling cart 21 and to support any material within the cart when it is engaged with the bottom frame 30 of the cart. A supporting member or leg 32 is carried by the bottom 30 and projects downwardly therefrom for supporting the cart 21 at the forward end thereof. The supporting leg 32 is removably carried by the bottom frame 30 on the forward arm thereof and the bottom of the leg 32 is adapted to engage the ground or other supporting surface at the same time that the wheels 22 engage the ground or supporting surface so that the cart 21 is supported on the ground by the wheels 22 and the leg 32 as clearly shown in Fig. 1 of the drawings.

A pair of side frames 33 are pivotally mounted on the opposite sides of the cart 21 by hinged engagement with the guide members 25. The side frame members 33 are also made of tubular construction and bent into a rectangle near the bottom thereof and another rectangle near the top thereof to form a pair of fixedly connected together sections of the side frames 33. Each of the side frames 33 is hingedly connected to the guide members 25 by straps 34 which are fixedly secured to the side frame 33 and hingedly engage with the guide members 25 as clearly shown in Fig. 4 of the drawings. The lower side frame members are positioned slightly downwardly below the upper side frame members to form therebetween a track 35 intermediate the length of the side frames 33 for the purpose to be more particularly described hereinafter. Each of the tracks 35 is adapted to be extended forwardly from the cart 21 and from the guide members 25. One end of each of the tracks 35 is adapted to be positioned in alignment with a fragmentary track section 36 between the upper and lower guide members 25 so that each partial track section 36 forms a continuation of a track 35 on the supporting frame 23.

Wire mesh screen 37 is adapted to be positioned in covering relation to each of the side frames 33 to complete the side walls of the material handling cart 21.

A bar 38 is positioned transversely of the material handling cart 21 and is adapted to slide in the tracks 35 and 36 along the length of the tracks and from a retracted position adjacent to the supporting frame 23 to a position outwardly from the supporting frame at the forward end of the material handling cart 21 as clearly shown in Fig. 4 of the drawings. The upper front frame section 40 is hingedly connected to the bar 38 for pivotally connecting the upper front frame section 40 to the lower front frame section 39. Each of the front frame sections is formed of a tubular frame and the lower front frame section 39 is covered with a wire screen 41. The upper front frame section 40 is covered with a wire screen 42 to form the front walls of the material handling cart 21 when the front frame sections 39 and 40 are moved to the forward end of the cart 21 upon sliding movement of the bar 38 from the rear section of the cart 21 adjacent to the supporting frame 23 to the forward end of the material cart 21 spaced forwardly from the supporting frame 23 as clearly shown in Fig. 1 of the drawings. The upper front frame member 40 is hingedly connected to the lower front frame member 39 by the hinge elements 43 whereby the upper front frame element 40 is hingedly mounted on the upper end of the lower front frame member 39 to provide for the swinging movement of the upper front frame member 40 from a horizontal position between the supporting frame member 23 and the front end of the cart 21, not shown in the drawings, and forming the upper end or surface of the lower chamber 44 of the cart 21 and the floor or bottom wall of the upper chamber 45. The bottom or lower chamber 44 is adapted to be closed upon swinging movement of the upper front frame member 40 to the horizontally extending position and the top chamber 45 is adapted to be opened at this time and the upper front frame member 40 forms the top surface of the bottom chamber 44. The folded position of the frame member 40 then engages, in its horizontal position, at its free end the rear frame 24 being pivotally connected to the lower front frame 39.

When the material handling cart 21 is adapted to be opened up from the folded position shown in Fig. 6 of the drawings, the side frame members 33 are swung outwardly about a vertically extending axis to the outwardly extending position shown in Fig. 1 of the drawings and the rod 38 is slid outwardly along the tracks 35 from an inner position to the outer position shown in Fig. 1 of the drawings. At this time the upper and lower front frame members 40 and 39 are moved into the desired position and the bottom frame member 30 may be swung from an inner position within the rear frame 24 to a forwardly extending bottom position as shown in the drawings.

When it is desired to carry small materials on the handling cart 21, the upper front frame member 40 may be folded to a horizontal position with reference to the supporting frame 23 to form an upwardly opening upper chamber 45, which is also open at the forward end thereof, and a closed lower chamber 44. When it is desired to provide a forwardly opening lower chamber 44, the lower front frame section 39 may be hinged upwardly on the bar 38 in order to provide a top for a forwardly opening lower chamber 44 the frame 39 then being the bottom of the upper chamber. When it is desired to open the lower chamber and upper chamber the bar 38 may be moved rearwardly in the track 35 so that the chambers 44 and 45 are in direct communication and the upper and lower front walls are moved rearwardly of the cart 21 so that elongated objects may be placed in the handling cart with the lower end of the objects resting on the bottom frame 30.

When it is desired to completely fold up the cart 21, the bar 38 is moved rearwardly in the track 35 and seated in the fragmentary track section 36 so that the upper and lower front frame sections are moved into overlying engagement with the forward surface of the supporting frame 23 and the side frames 33 may be swung about the guide bars 25 so that the material handling cart 21 will provide a compact arrangement of frame members as clearly shown in Fig. 6 of the drawings. In order to fold up the cart from its extended position the leg 32 must first be removed, whereupon the bottom 30 may be swung upwardly to its overlying position with the supporting frame 23 and then the upper and lower front frame sections 40 and 39 moved toward the rear frame 23 along the length of the track 35 and track section 36 until they overlie the folded bottom 30 and the supporting frame 23 at which time the side frames 33 will be swung into overlying position relative to the front frame sections in order to completely close the material handling cart 21.

While the specific details of one embodiment of this invention have been herein shown and described, the invention is not confined thereto as changes and alterations may be made without departing from the spirit and scope thereof as defined in the appended claims.

I claim:

1. A material handling cart comprising a supporting frame, wheels on one end of said supporting frame, a bottom frame hingedly mounted on one end of said supporting frame for movement about a horizontal axis, side frames hingedly connected on said supporting frame for movement about a vertical axis, a lower front frame slidable on said side frames for movement fore and aft by sliding relative to said supporting frame, an upper front frame hingedly connected to said lower front frame for swinging movement about a horizontal axis and a supporting member fixed on said bottom frame spaced from said wheels and a screen on each of said frames.

2. A material handling cart of the kind described comprising a supporting frame, wheels on one end of said supporting frame, a handle on the other end of said frame, guide members on said supporting frame forwardly thereof, a bottom frame hinged on one end of said supporting frame and swingable about a horizontal axis from a position at right angles to said supporting frame to a position overlying said supporting frame, side frames hingedly connected to said guide members for swinging from a forwardly extending position at right angles to said supporting frame to a position overlying said supporting frame, a track on each of said side frames, a rod engaging in said tracks and slidable from a position outwardly of said supporting frame to a position adjacent to said supporting frame, a lower front frame hinged on said rod and swingable from a position parallel to and spaced from said supporting frame to constitute a lower compartment closed at the front, rear and side to a position at right angles to said supporting frame to form a compartment having a top, bottom and side walls and open at the forward side thereof, a top front frame hinged on said lower front frame and swingable from a position parallel to and spaced from said supporting frame to a position at right angles to said supporting frame to constitute an upper chamber with side walls, a bottom and open at the forward side thereof, said guide members being spaced intermediate the length of said supporting frame in alignment with one end of said tracks for receiving said rod upon folding said frames to the folded position of said cart.

3. A material handling cart comprising a supporting frame, a bottom frame hinged on said supporting frame for movement on a horizontal axis, side frames hingedly mounted on the opposite sides of said supporting frame for movement on a vertical axis, a bar slidably connected between said side frames intermediate the length thereof, a lower front frame hingedly connected to said bar for movement about a horizontal axis and an upper front frame hingedly connected to said lower front frame for movement on a horizontal axis.

4. A material handling cart as set forth in claim 3 including a wire mesh on each of said frames.

References Cited in the file of this patent

UNITED STATES PATENTS 1,534,672     Stewart  --------------- Apr. 21, 1925